(12) United States Patent
Alpert et al.

(10) Patent No.: US 9,912,467 B2
(45) Date of Patent: Mar. 6, 2018

(54) FULL DUPLEX TECHNIQUE

(71) Applicant: QUALCOMM Incorporated, San Diego, CA (US)

(72) Inventors: Reuven Alpert, Givat-Ada (IL); Amichai Sanderovich, Atlit (IL)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 14/862,039

(22) Filed: Sep. 22, 2015

(65) Prior Publication Data

US 2017/0085362 A1    Mar. 23, 2017

(51) Int. Cl.
*H04L 7/00* (2006.01)
*H04L 5/14* (2006.01)
(Continued)

(52) U.S. Cl.
CPC .......... *H04L 7/0041* (2013.01); *H04B 17/14* (2015.01); *H04B 17/318* (2015.01); *H04L 5/14* (2013.01); *H04B 7/0617* (2013.01); *H04B 7/086* (2013.01)

(58) Field of Classification Search
CPC ....... H04L 5/0001; H04L 5/14; H04L 25/026; H04L 25/0264; H04J 11/0023
See application file for complete search history.

(56) References Cited

U.S. PATENT DOCUMENTS 6,037,898 A * 3/2000 Parish ................ H01Q 3/267
342/174
8,982,772 B2  3/2015 Fischer et al.
(Continued)

FOREIGN PATENT DOCUMENTS

WO    WO-2014003387 A1    1/2014

OTHER PUBLICATIONS

Huberman S., et al., "MIMO Full-Duplex Precoding: A Joint Beamforming and Self-Interference Cancellation Structure", IEEE Transactions on Wireless Communications, IEEE Service Center, Piscataway, NJ, US, Apr. 1, 2015 (Apr. 1, 2015 ), XP011577915, vol. 14, No. 4, pp. 2205-2217. ISSN: 1536-1276, DOI: 10.1109/TWC.2014.2382589.
(Continued)

*Primary Examiner* — Benjamin H Elliott, IV
(74) *Attorney, Agent, or Firm* — Loza & Loza, LLP/Qualcomm

(57) ABSTRACT

Certain aspects of the present disclosure provide an apparatus for wireless communications. The apparatus comprises an interface configured to output a first signal for transmission via at least one first antenna, to output a second signal for transmission via at least one second antenna, to receive the transmitted first signal via the at least one second antenna, and to receive the transmitted second signal via the at least one first antenna. The apparatus also comprises a processing system configured to measure a phase of the received first signal and a phase of the received second signal, to determine a phase correction for the at least one first antenna based on the measured phase of the received first signal and the measured phase of the received second signal, and to shift a phase of a transmit signal by the phase correction, wherein the interface is configured to output the transmit signal for transmission via the at least one first antenna after the transmit signal is phase shifted.

20 Claims, 7 Drawing Sheets

(51) Int. Cl.
  *H04B 17/14* (2015.01)
  *H04B 17/318* (2015.01)
  *H04B 7/06* (2006.01)
  *H04B 7/08* (2006.01)

(56) References Cited

U.S. PATENT DOCUMENTS

| | | | | |
|---|---|---|---|---|
| 2001/0045907 | A1* | 11/2001 | Rexberg | H01Q 3/267 |
| | | | | 342/368 |
| 2012/0218139 | A1* | 8/2012 | Suzuki | G01S 3/74 |
| | | | | 342/189 |
| 2013/0088382 | A1* | 4/2013 | Lee | G01S 7/4026 |
| | | | | 342/174 |
| 2013/0114468 | A1 | 5/2013 | Hui et al. | |
| 2014/0232596 | A1* | 8/2014 | Apker | G01S 19/23 |
| | | | | 342/357.62 |
| 2014/0233436 | A1 | 8/2014 | Long | |
| 2014/0242914 | A1* | 8/2014 | Monroe | H04B 17/11 |
| | | | | 455/63.4 |
| 2014/0286156 | A1* | 9/2014 | Kohli | H04B 15/00 |
| | | | | 370/225 |
| 2015/0016309 | A1 | 1/2015 | Fang et al. | |
| 2015/0126146 | A1* | 5/2015 | Wang | H04B 1/1027 |
| | | | | 455/296 |
| 2015/0130655 | A1* | 5/2015 | Aizawa | G01S 3/74 |
| | | | | 342/147 |
| 2015/0188646 | A1 | 7/2015 | Bharadia et al. | |
| 2015/0341157 | A1* | 11/2015 | Eltawil | H04L 5/1453 |
| | | | | 370/278 |
| 2016/0033625 | A1* | 2/2016 | Floyd | G01S 7/4021 |
| | | | | 342/174 |
| 2016/0127030 | A1* | 5/2016 | Kim | H04B 7/0413 |
| | | | | 370/329 |
| 2016/0211898 | A1* | 7/2016 | Cai | H04B 7/0617 |
| 2017/0085362 | A1* | 3/2017 | Alpert | H04L 5/14 |

OTHER PUBLICATIONS

International Search Report and Written Opinion—PCT/US2016/048482—ISA/EPO—dated Oct. 31, 2016.
Sabharwal A., et al., "In-Band Full-Duplex Wireless: Challenges and Opportunities," 2014, 22 pages.
Zheng G., "Joint Beamforming Optimization and Power Control for Full-Duplex MIMO Two-way Relay Channel," 2014, pp. 1-11.

* cited by examiner

FULL DUPLEX TECHNIQUE

FIELD

Certain aspects of the present disclosure generally relate to wireless communications and, more particularly, to full-duplex wireless communications.

BACKGROUND

In order to address the issue of increasing bandwidth requirements demanded for wireless communications systems, different schemes are being developed. In some schemes, data is wirelessly transmitted at high data rates (e.g., several Gigabits/s) over one or more channels in the 60 GHz range. Also, in some schemes, beamforming is employed at a wireless device to direct transmission and reception towards another device (target device). The strong directionality of the transmission and reception extends the range over which the devices can communicate with each other, and reduces interference to neighboring devices.

SUMMARY

One aspect relates to an apparatus for wireless communications. The apparatus comprises an interface configured to output a first signal for transmission via at least one first antenna, to output a second signal for transmission via at least one second antenna, to receive the transmitted first signal via the at least one second antenna, and to receive the transmitted second signal via the at least one first antenna. The apparatus also comprises a processing system configured to measure a phase of the received first signal and a phase of the received second signal, to determine a phase correction for the at least one first antenna based on the measured phase of the received first signal and the measured phase of the received second signal, and to shift a phase of a transmit signal by the phase correction, wherein the interface is configured to output the transmit signal for transmission via the at least one first antenna after the transmit signal is phase shifted.

A second aspect relates to a method for self calibration of an apparatus. The method comprises transmitting a first signal via at least one first antenna, receiving the transmitted first signal via at least one second antenna, transmitting a second signal via the at least one second antenna at the apparatus, and receiving the transmitted second signal via the at least one first antenna at the apparatus. The method also comprises measuring a phase of the received first signal and a phase of the received second signal, determining a phase correction for the at least one first antenna based on the measured phase of the received first signal and the measured phase of the received second signal, shifting a phase of a transmit signal by the phase correction, and transmitting the transmit signal via the at least one first antenna after the transmit signal is phase shifted.

A third aspect relates to an apparatus for wireless communications. The apparatus comprises means for transmitting a first signal via at least one first antenna, means for receiving the transmitted first signal via at least one second antenna, means for transmitting a second signal via the at least one second antenna at the apparatus, and means for receiving the transmitted second signal via the at least one first antenna at the apparatus. The apparatus also comprises means for measuring a phase of the received first signal and a phase of the received second signal, means for determining a phase correction for the at least one first antenna based on the measured phase of the received first signal and the measured phase of the received second signal, means for shifting a phase of a transmit signal by the phase correction, and means for transmitting the transmit signal via the at least one first antenna after the transmit signal is phase shifted.

A fourth aspect relates to a computer-readable medium. The computer-readable medium comprises instructions stored thereon for transmitting a first signal via at least one first antenna, receiving the transmitted first signal via at least one second antenna, transmitting a second signal via the at least one second antenna at the apparatus, and receiving the transmitted second signal via the at least one first antenna at the apparatus. The computer-readable medium also comprises instructions for measuring a phase of the received first signal and a phase of the received second signal, determining a phase correction for the at least one first antenna based on the measured phase of the received first signal and the measured phase of the received second signal, shifting a phase of a transmit signal by the phase correction, and transmitting the transmit signal via the at least one first antenna after the transmit signal is phase shifted.

A fifth aspect relates to a wireless node. The wireless node comprises at least one first antenna and at least one second antenna. The wireless node also comprises a transmitter configured to transmit a first signal via the at least one first antenna, and to transmit to a second signal via at the least one second antenna, and a receiver configured to receive the transmitted first signal via the at least one second antenna, and to receive the transmitted second signal via the at least one first antenna. The wireless node further comprises a processing system configured to measure a phase of the received first signal and a phase of the received second signal, to determine a phase correction for the at least one first antenna based on the measured phase of the received first signal and the measured phase of the received second signal, and to shift a phase of a transmit signal by the phase correction, wherein the transmitter is configured to transmit the transmit signal via the at least one first antenna after the transmit signal is phase shifted.

DETAILED DESCRIPTION

Figure 1:
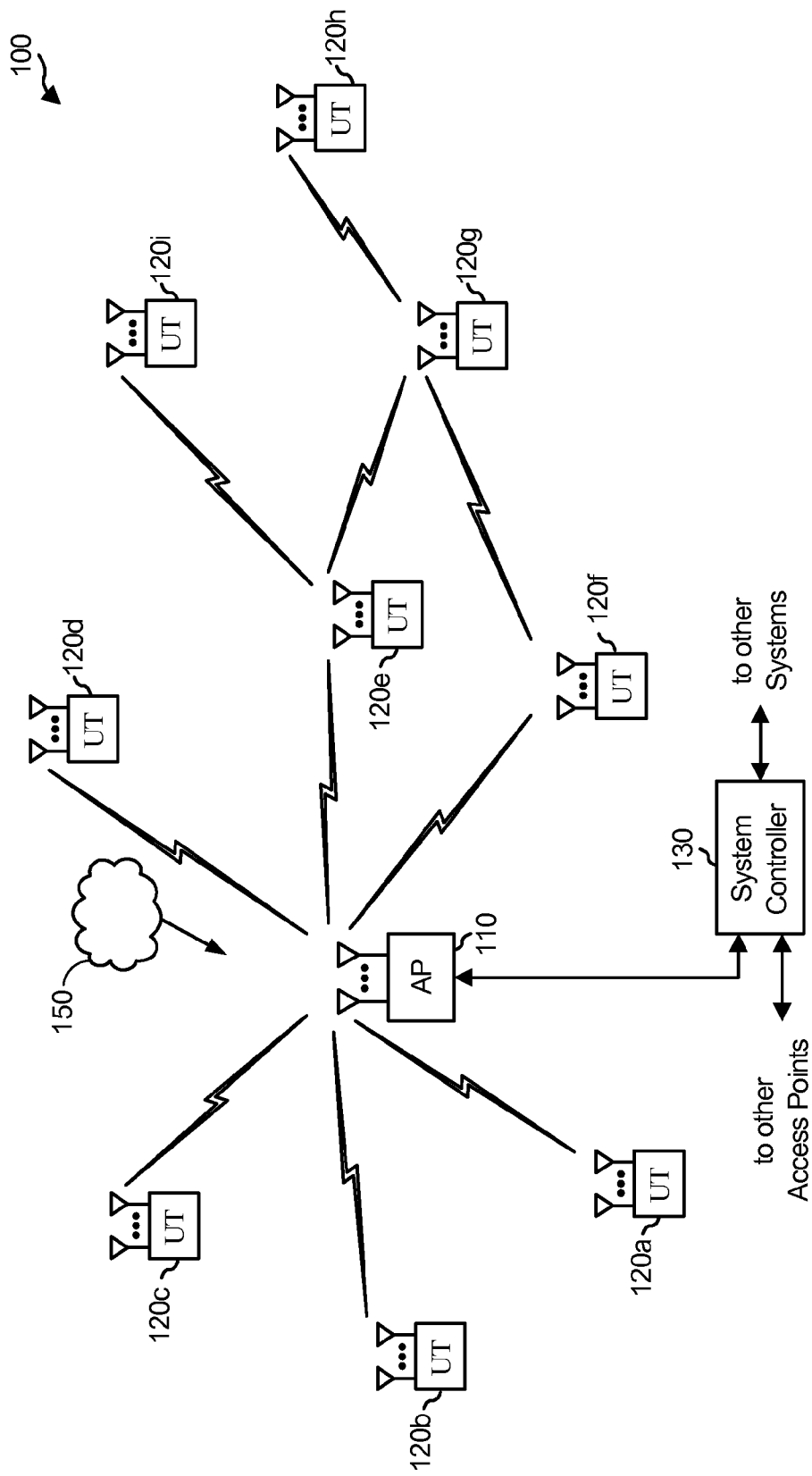
FIG. 1 illustrates an exemplary wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple access terminals. A TDMA system may allow multiple access terminals to share the same frequency channel by dividing the transmission signal into different time slots, each time slot being assigned to different access terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a block diagram of an exemplary wireless communication system 100 with a plurality of wireless nodes, such as access points and access terminals. For simplicity, only one access point 110 is shown. An access point is generally a fixed station that communicates with access terminals and may also be referred to as a base station or some other terminology. An access terminal may be fixed or mobile, and may be referred to as a mobile station, a wireless device or some other terminology. Access point 110 may communicate with one or more access terminals 120*a* to 120*i* at any given moment on the downlink and uplink. The downlink (i.e., forward link) is the communication link from the access point 110 to the access terminals 120*a* to 120*i*, and the uplink (i.e., reverse link) is the communication link from the access terminals 120*a* to 120*i* to the access point 110. An access terminal may also communicate peer-to-peer with another access terminal. A system controller 130 couples to and provides coordination and control for the access points. The access point 110 may communicate with other devices coupled to a backbone network 150.

Figure 2:
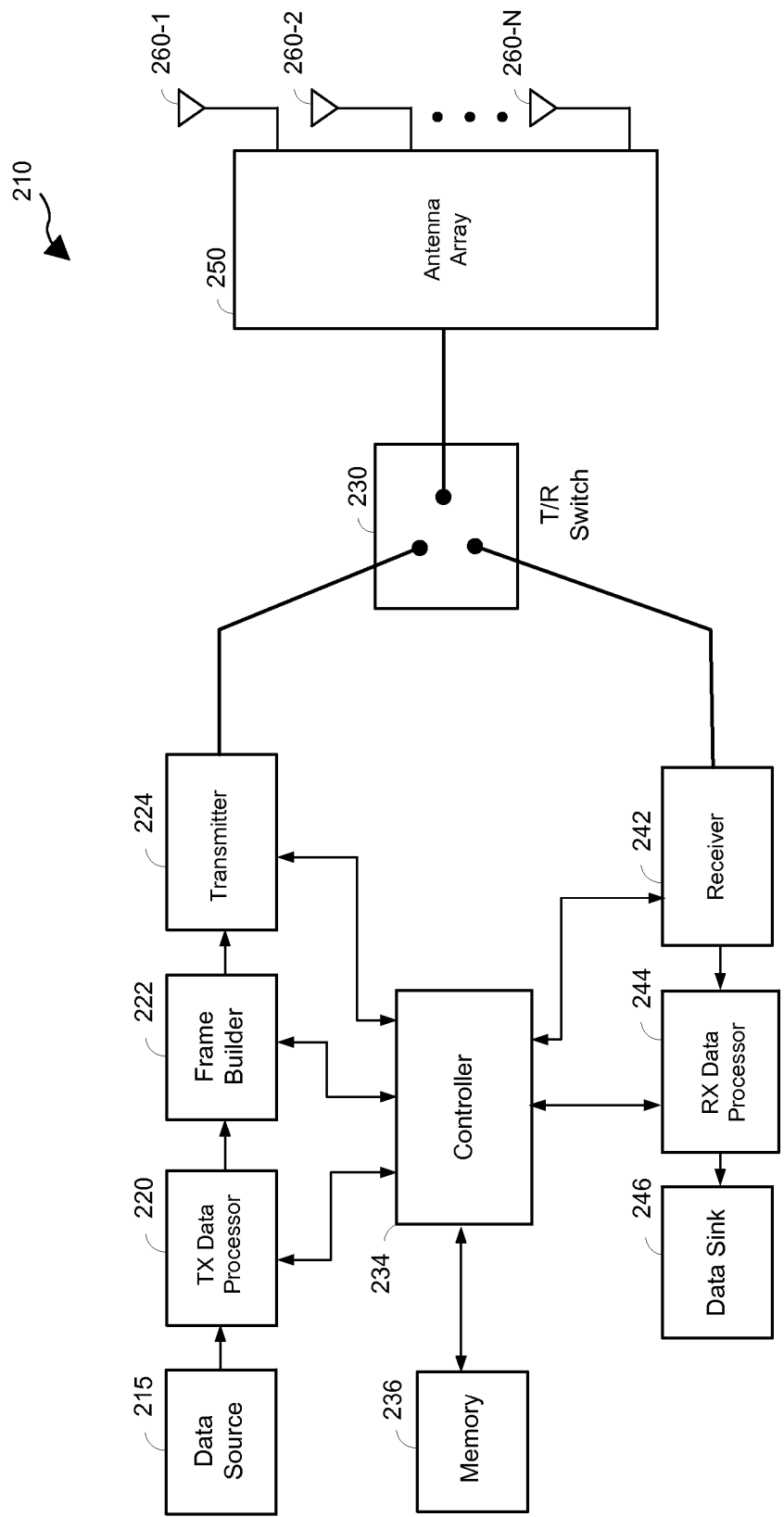
FIG. 2 is a block diagram of a wireless node with a half-duplex architecture in accordance with certain aspects of the present disclosure.

FIG. 2 illustrates a wireless node 210 according to certain aspects, which may be used to implement an access point 110 or an access terminal 120. For the example in which the wireless node 210 implements an access point 110, the wireless node 210 is a transmitting entity for the downlink and a receiving entity for the uplink. In this example, the wireless node 210 may communicate with one or more access terminals 120 or another access point. For the example in which the wireless node 210 implements an access terminal 120, the wireless node 210 is a transmitting entity for the uplink and a receiving entity for the downlink. In this example, the wireless node 210 may communicate with an access point 110 or another access terminal 120

(e.g., peer-to-peer communication). As used herein, a "transmitting entity" is an independently operated apparatus or wireless node capable of transmitting data via a wireless channel, and a "receiving entity" is an independently operated apparatus or wireless node capable of receiving data via a wireless channel.

The wireless node 210 comprises a transmit data processor 220, a frame builder 222, a transmitter 224, a receiver 242, a receive data processor 244, a transmit/receive (T/R) switch 230, an antenna array device 250, and a plurality of antennas 260-1 to 260-N. The wireless node 210 may also comprise a controller 234 and a memory 236 coupled to the controller 234. The controller 234 is configured to control operations of the wireless node 210, as discussed further below. The memory 236 stores instructions that, when executed by the controller 234, cause the controller 234 to perform one or more of the operations described herein. The memory 236 may also store operational parameters for the wireless node 210, as discussed further below.

In the example shown in FIG. 2, the wireless node 210 has a half-duplex architecture, in which the T/R switch 230 couples the transmitter 224 to the antenna array device 250 for transmission or couples the receiver 242 to the antenna array device 250 for reception, but not both simultaneously. The T/R switch 230 may be controlled by the controller 234. In this regard, the controller 234 may command the T/R switch 230 to couple the transmitter 224 to the antenna array device 250 when the wireless node 210 is transmitting, and command the T/R switch 230 to couple the antenna array device 250 to the receiver 242 when the wireless node 210 is receiving.

To transmit data, the transmit data processor 220 receives data (e.g., data bits) from a data source 215, and processes the data for transmission. For example, the transmit data processor 220 may encode the data (e.g., data bits) into encoded data, and modulate the encoded data into data symbols. The transmit data processor 220 may support different modulation and coding schemes (MCSs). For example, the transmit data processor 220 may encode the data (e.g., using low-density parity check (LDPC) encoding) at any one of a plurality of different coding rates. Also, the transmit data processor 220 may modulate the encoded data using any one of a plurality of different modulation schemes, including, but not limited to, BPSK, QPSK, 16QAM, 64QAM, 64APSK, 128APSK, 256QAM, and 256APSK.

In certain aspects, the controller 234 may send a command to the transmit data processor 220 specifying which modulation and coding scheme (MCS) to use (e.g., based on channel conditions), and the transmit data processor 220 may encode and modulate data from the data source 215 according to the specified MCS. It is to be appreciated that the transmit data processor 220 may perform additional processing on the data such as data scrambling, and/or other processing. The transmit data processor 220 outputs the data symbols to the frame builder 222.

Figure 3:
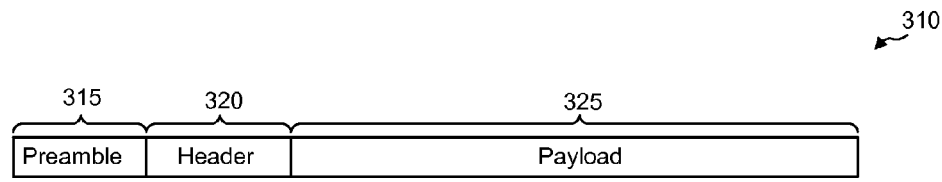
FIG. 3 illustrates an exemplary frame structure in accordance with certain aspects of the present disclosure.

The frame builder 222 constructs a frame (also referred to as a packet), and inserts the data symbols into a data payload of the frame. An exemplary frame structure 310 is shown in FIG. 3. In this example, the frame structure 310 includes a preamble 315, a header 320, and the data payload 325. The preamble 315 may include a short training field (STF) sequence and a channel estimation (CE) sequence to assist the receiving device (e.g., another wireless node) in receiving the frame. The header 320 may include information related to the data in the payload 325. For example, the header 320 may include a duration field (also referred to as a length field) indicating the duration of the frame and/or payload 325 and an MCS field indicating the MCS used to encode and modulate the data in the payload 325. This information allows the receiving device to demodulate and decode the data. The header 320 may also include a destination address field identifying the destination (target device) of the data in the payload 325. The frame builder 222 outputs the frame to the transmitter 224.

The transmitter 224 processes the frame for transmission. For example, the transmitter 224 may support different transmission modes such as an orthogonal frequency-division multiplexing (OFDM) transmission mode and a single-carrier (SC) transmission mode. In this example, the controller 234 may send a command to the transmitter 224 specifying which transmission mode to use, and the transmitter 224 may process the frame for transmission according to the specified transmission mode. The transmitter 224 may also perform front-end RF processing on the frame (e.g., conversion to analog, amplification, filtering, and frequency up-conversion) to generate one or more transmit signals suitable for transmission via the antenna array device 250 and antennas 260-1 to 260-N.

Figure 4:
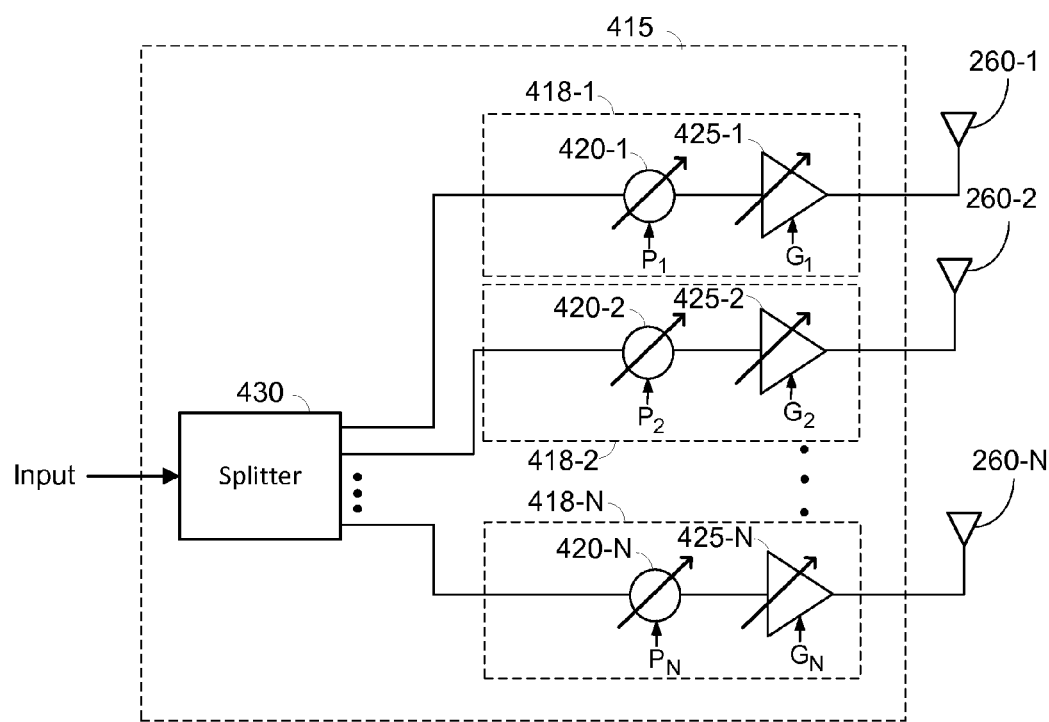
FIG. 4 illustrates an exemplary transmit beamformer in accordance with certain aspects of the present disclosure.

The T/R switch 230 couples the one or more transmit signals from the transmitter 224 to the antenna array device 250. The antenna array device 250 may perform beamforming on the one or more transmit signals from the transmitter 224 so that the one or more transmit signals are transmitted in a desired direction via the antennas 260-1 to 260-N. In this regard, FIG. 4 shows an exemplary transmit beamformer 415 that may be implemented in the antenna array device 250 to generate a directional transmit beam for directing transmission in a desired direction. The beamformer 415 comprises a signal splitter 430, and a plurality of branches 418-1 to 418-N, where each branch 418-1 to 418-N may be coupled to a respective one of the antennas 260-1 to 260-N. Each branch 418-1 to 418-N may further comprise a respective tunable phase shifter 420-1 to 420-N and respective tunable amplifier 425-1 to 425-N. The phase shift of each phase shifter 420-1 to 420-N is controlled by a respective phase-shift control signal $P_1$ to $P_N$, and the gain of each amplifier 425-1 to 425-N is controlled by a respective gain control signal $G_1$ to $G_N$.

In operation, the splitter 430 receives a signal for transmission, and splits the signal among the branches 418-1 to 418-N. Each phase shifter 420-1 to 420-N shifts the phase of the signal in the respective branch according to the respective phase-shift control signal $P_1$ to $P_N$, and each amplifier 425-1 to 425-N amplifies the signal in the respective branch according to the respective gain control signal $G_1$ to $G_N$. The output signal of each branch 418-1 to 418-N is fed to the respective antenna for transmission. The transmitted output signals form a directional transmit beam, in which the direction of the transmit beam is a function of the relative phases and amplitudes of the transmitted output signals, which are controlled by the phase-shift control signals $P_1$ to $P_K$, and the gain control signals $G_1$ to $G_N$.

In certain aspects, the controller 234 may control the direction of the transmit beam by controlling the values of the phase-shift control signals $P_1$ to $P_N$ and the gain control signals $G_1$ to $G_N$ accordingly. In this regard, the controller 234 may store a set of phase values and gain values (e.g., weight vector) for each one of a plurality of different beam directions in the memory 236. In this example, the controller 234 may point the transmit beam in a particular direction by retrieving the corresponding set of phase values and gain values from the memory 236, and setting the phase shifts and gains of the beamformer 415 according to the retrieved phase and gain values, respectively.

Returning to FIG. 2, to receive data, the antennas 260-1 to 260-N and the antenna array device 250 may receive one or more receive signals (e.g., from another wireless node). As discussed further below, the antenna array device 250 may perform beamforming on the signals from the antennas 260-1 to 260-N to direct reception in a desired direction (enhance receive sensitivity in the desired direction).

The T/R switch 230 couples the one or more receive signals to the receiver 242. The receiver 242 may perform front-end processing on the one or more receive signals (e.g., frequency down-conversion, amplification, filtering and conversion to digital). The receiver 242 may then process the down-converted signal (e.g., baseband signal) to recover data symbols in the signal. In this regard, the receiver may detect the start of a frame in the signal using the STF sequence in the preamble 315 of the frame. The receiver 242 may also use the STF for automatic gain control (AGC) adjustment. The receiver 242 may also perform channel estimation (e.g., using the CE sequence in the preamble 315 of the frame) and perform channel equalization on the received signal based on the channel estimation. Further, the receiver 242 may recover information (e.g., MCS scheme) from the header 320 of the frame, and send the information to the controller 234. After performing channel equalization, the receiver 242 may recover data symbols from the frame, and output the recovered data symbols to the receive data processor 244 for further processing. It is to be appreciated that the receiver 242 may perform other processing.

The receive data processor 244 receives the data symbols from the receiver 242 and an indication of the corresponding MSC scheme from the controller 234. The receive data processor 244 demodulates and decodes the data symbols to recover the data according to the indicated MSC scheme, and outputs the recovered data (e.g., data bits) to a data sink 246 for storage and/or further processing.

Figure 5:
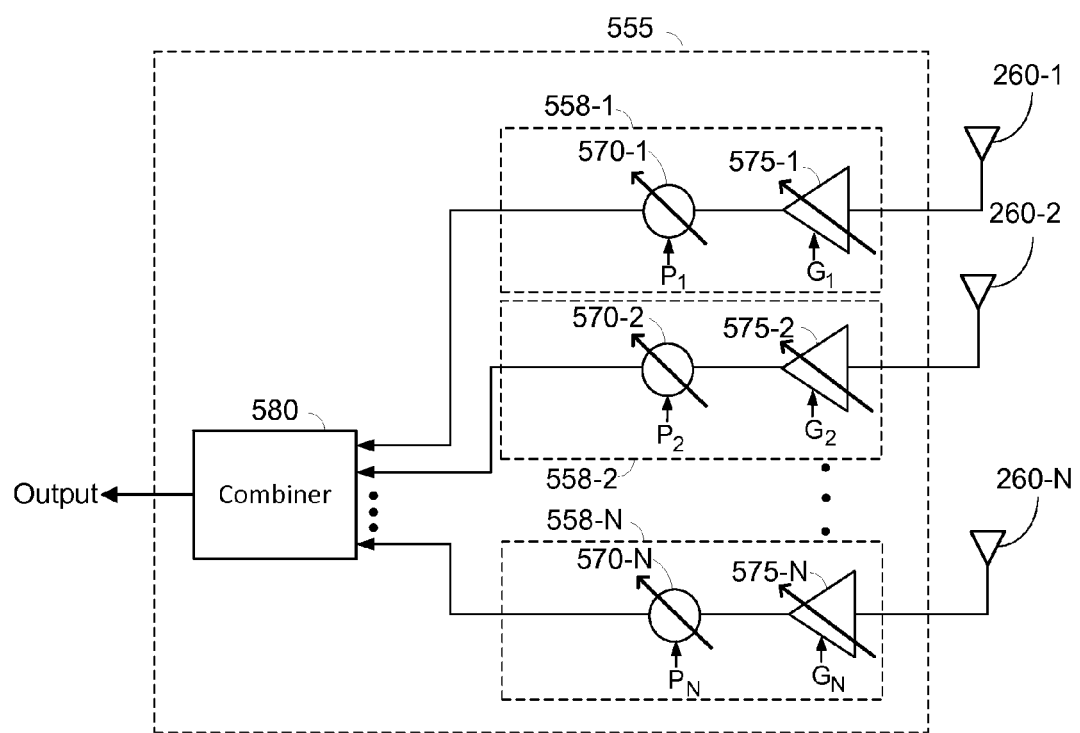
FIG. 5 illustrates an exemplary receive beamformer in accordance with certain aspects of the present disclosure.

As discussed, the antenna array device 250 may perform beamforming on the signals from the antennas 260-1 to 260-N to direct reception in a desired direction (enhance receive sensitivity in the desired direction). In this regard, FIG. 5 shows an example of a receive beamformer 555 that may be implemented in the antenna array device 250 to receive signals using a directional receive beam pointed in a desired direction. The beamformer 555 comprises a signal combiner 580, and a plurality of branches 558-1 to 558-N, where each branch 558-1 to 558-N is coupled to a respective one of the antennas 260-1 to 260-N. Each branch 558-1 to 558-N may further comprise a respective tunable phase shifter 570-1 to 570-N and respective tunable amplifier 575-1 to 575-N. The phase shift of each phase shifter 570-1 to 570-N is controlled by a respective phase-shift control signal $P_1$ to $P_N$, and the gain of each amplifier 575-1 to 575-N is controlled by a respective gain control signal $G_1$ to $G_N$.

In operation, each of the branches 558-1 to 558-N receives a signal from the respective antenna 260-1 to 260-N. Each phase shifter 570-1 to 570-N shifts the phase of the signal in the respective branch 558 according to the respective phase-shift control signal $P_1$ to $P_N$, and each amplifier 575-1 to 575-N amplifies the signal in the respective branch 558 according to the respective gain control signal $G_1$ to $G_N$. The output signals of the branches 558-1 to 558-N are fed to the signal combiner 580, which combines the signals into an output signal. The relative phases and amplitudes of the branches increase receive sensitivity within a directional receive beam, in which the direction of the receive beam is a function of the phase-shift control signals $P_1$ to $P_N$, and the gain control signals $G_1$ to $G_N$.

In certain aspects, the controller 234 may control the direction of the receive beam by controlling the values of the phase-shift control signals $P_1$ to $P_N$, and the gain control signals $G_1$ to $G_N$, accordingly. In this regard, the controller 234 may store a set of phase values and gain values (e.g., weight vector) for each one of a plurality of beam directions in the memory 236. In this example, the controller 234 may point the receive beam in a particular direction by retrieving the correspond set of phase values and gain values from the memory 236, and setting the phase shifts and gains of the beamformer 555 according to the retrieved phase and gain values, respectively.

Thus, the wireless node 210 employs beamforming to direct transmission and reception towards a target wireless node (e.g., another wireless node with which the wireless node 210 communicates). The strong directionality of the transmission and reception extends the range over which the wireless node 210 can communicate with the target wireless node, and reduces interference to neighboring devices. Beamforming may be particularly useful in a high-speed 60 GHz wireless communication system. This is because 60 GHz signals suffer from large path loss even at relatively short distances. Beamforming compensates for the high path loss by directing transmission and reception towards a target wireless node.

In order to maximize the benefits of beamforming, it is desirable that a wireless node be capable of precisely directing a transmit beam and a receive beam. However, the transmit beam pattern and receive beam pattern of a wireless node are affected by the characteristics of a radome (e.g., plastic enclosure) enclosing the antennas and/or other factors. Therefore, beam calibration is typically performed for a wireless node to compensate for the effects of the radome and/or other factors. Otherwise, sub-optimal beams are used, which reduces the range of the wireless node.

For a wireless node with a half-duplex architecture (e.g., wireless node 210 shown in FIG. 2), beam calibration is typically performed in a laboratory. For example, the transmit beam pattern of the wireless node may be calibrated by transmitting signals from one or more antennas of the node and measuring the phases and/or amplitudes of the signals at one or more antennas of an external device in the laboratory, where the external device is positioned at a known location and orientation relative to the wireless node. The measurements are used to determine phase and gain corrections (e.g., phase and gain offsets) for the antennas of the wireless node to cancel out or reduce the effects of the radome and/or other factors. The determined phase and gain corrections may then be applied to the phase shifters and amplifiers of the antennas of the wireless node to cancel out or reduce the effects of the radome and/or other factors, and therefore enable more precise control of the beam direction of the wireless node.

The half-duplex architecture shown in FIG. 2 is incapable of performing beam calibration on its own. This is because the half-duplex architecture is only capable of transmitting or receiving at a given time, but not both simultaneously. In other words, the half-duplex architecture cannot transmit and receive simultaneously to perform self-beam calibration. Another disadvantage is that the half-duplex architecture does not allow a wireless node to perform enhanced radar and positioning applications such as gesture recognition or movement sensing (e.g., for security purposes). In addition, the half-duplex architecture does not allow the wireless node to detect defects, for example, in the front-end transmitter or receiver.

Figure 6:
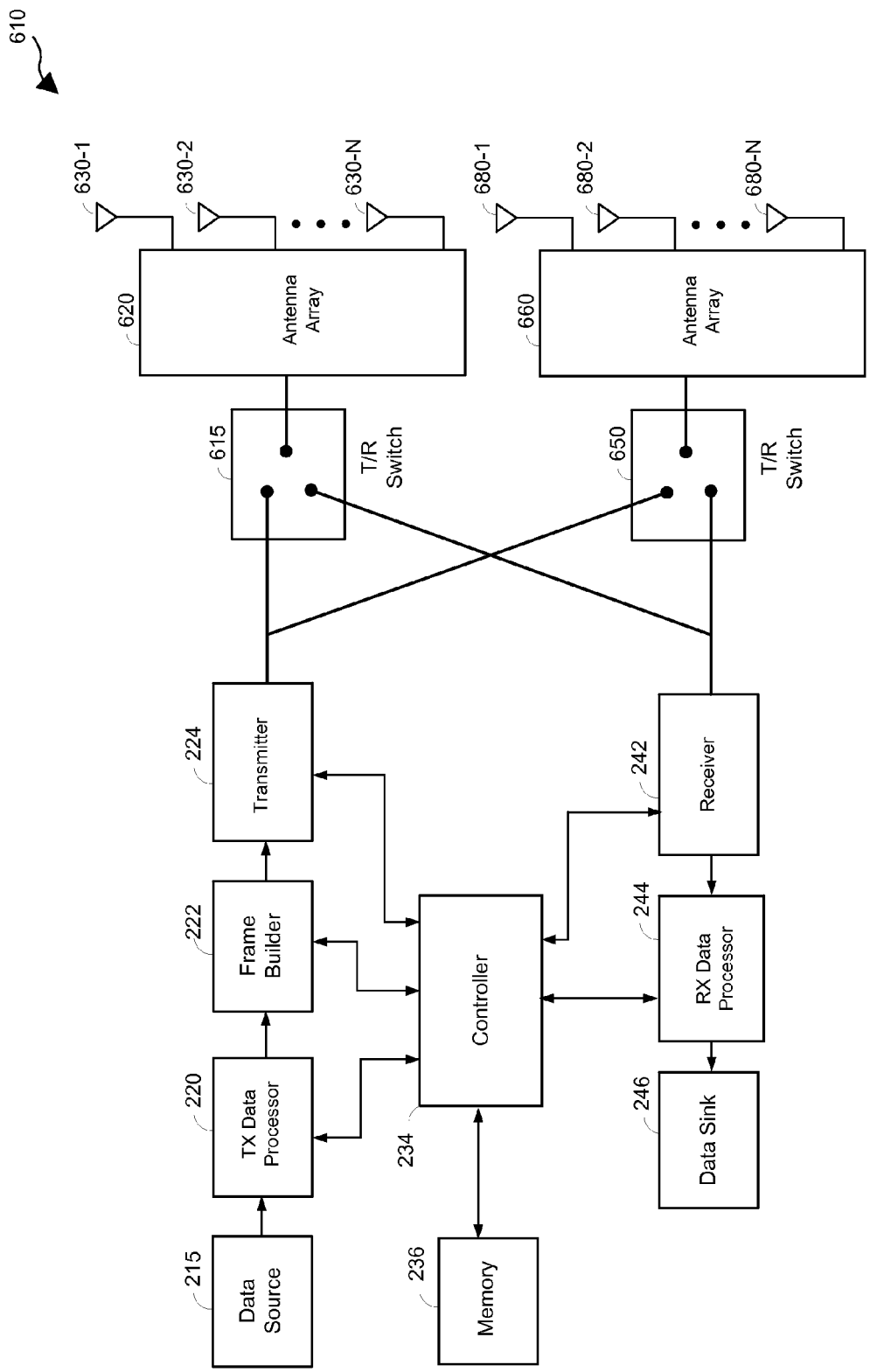
FIG. 6 is a block diagram of a wireless node with a full-duplex architecture in accordance with certain aspects of the present disclosure.

FIG. 6 illustrates a wireless node 610 with a full-duplex architecture according to certain aspects of the present disclosure. The full-duplex architecture enables the wireless node 610 to transmit and receive simultaneously. This allows the wireless node 610 to perform beam calibration on its own (self-beam calibration), reducing or eliminating the need for performing the calibration in a laboratory, which can be costly and/or time consuming. This also allows the wireless node 610 to perform radar tracking, and perform self testing of the transmitter and receiver, as discussed further below.

In the example in FIG. 6, the wireless node 610 comprises a first T/R switch 615, a second T/R switch 650, a first antenna array device 620, a first plurality of antennas 630-1 to 630-N, a second antenna array device 660, and a second plurality of antennas 680-1 to 680-N. The first T/R switch 615 is configured to selectively couple the transmitter 224 or the receiver 242 to the first antenna array device 620, and the second T/R switch 650 is configured to selectively couple the transmitter 224 or the receiver 242 to the second antenna array device 660. The first and second T/R switches 615 and 650 allow the wireless node 610 to simultaneously transmit and receive. For example, the first T/R switch 615 may couple the transmitter 224 to the first antenna array device 620 to transmit one or more signals via the first plurality of antennas 630-1 to 630-N, and the second T/R switch 650 may couple the receiver 242 to the second antenna array device 660 to receive one or more signals via the second plurality of antennas 680-1 to 680-N. In another example, the second T/R switch 650 may couple the transmitter 224 to the second antenna array device 660 to transmit one or more signals via the second plurality of antennas 680-1 to 680-N, and the first T/R switch 615 may couple the receiver 242 to the first antenna array device 620 to receive one or more signals via the first plurality of antennas 630-1 to 630-N. In certain aspects, the first and second T/R switches 615 and 650 may be controlled by the controller 234, as discussed further below.

The full-duplex architecture allows the wireless node 610 to perform self-beam calibration. For example, the controller 234 may perform calibration for the first plurality of antennas 630-1 to 630-N as follows. The controller 234 may first command the first T/R switch 615 to couple the transmitter 224 to the first antenna array device 620, and command the second T/R switch 650 to couple the receiver 242 to the second antenna array device 660.

The transmitter 224 may then transmit a signal from each one of the first plurality of antennas 630-1 to 630-N for total of N transmissions that can be time, frequency or code division transmissions, as is common in the art. The signal may be transmitted one-by-one from each one of the first plurality of antennas 630-1 to 630-N or transmitted simultaneously from the first plurality of antennas 630-1 to 630-N. In certain aspects, the signals may be transmitted from the first plurality of antennas 630-1 to 630-N in different frequencies or using different spreading sequences.

The receiver 242 may receive the signals transmitted from the first plurality of antennas 630-1 to 630-N using one of the second plurality of antennas 680-1 to 680-N (i.e., a single antenna in the second plurality of antennas 680-1 to 680-N). Each of the received signals may be denoted Ti, where i is an antenna index indicating the antenna from which the signals was transmitted. In this example, i may have a range of 1 to N since there are N antennas 630-1 to 630-N in this example. The receiver 242 and/or controller 234 may measure the phase and amplitude of each received signal Ti and store the results in the memory 236.

The controller 234 may then command the second T/R switch 650 to couple the transmitter 224 to the second antenna array device 660, and command the first T/R switch 615 to couple the receiver 242 to the first antenna array device 620. The transmitter 224 may then transmit a signal from the one of the second plurality of antennas 680-1 to 680-N discussed above (i.e., the same antenna used to receive the signals from the first plurality of antennas 630-1 to 630-N). This signal is received by each one of the first plurality of antennas 630-1 to 630-N. The received signal at each one of first plurality of antennas 630-1 to 630-N may be denoted Ri, where i is an antenna index indicating the antenna at which the signal is received. The receiver 242 and/or controller 234 may measure the phase and amplitude of each received signal Ri and store the results in the memory 236.

The controller 234 may then determine the phase correction for each one of the first plurality of antennas 630-1 to 630-N by compensating the phases between the transmitted and received signals for each antenna as follows:

$$\text{Phase\_correction\_}i=\text{phase}(Ri)-\text{phase}(Ti)+\text{phase constant} \quad (1)$$

where i is the antenna index indicating the respective one of the first plurality of antennas, phase(Ri) is the measured phase of the signal received at the respective antenna, and phase(Ti) is the measured phase of the signal received by the single antenna in the second plurality of antennas from the respective antenna. The phase constant is used to help minimize the quantization error of the phases, and may be determined using vector quantization techniques or other techniques.

The controller 234 may then determine the gain correction for each one of the first plurality of antennas 630-1 to 630-N by compensating the gains between the transmitted and received signal for each antenna as follows:

$$\text{Gain\_correction\_}i=\text{gain}(Ri)-\text{gain}(Ti)+\text{gain constant} \quad (2)$$

where i is the antenna index indicating the respective one of the first plurality of antennas, gain(Ri) is the measured amplitude of the signal received at the respective antenna, and phase(Ti) is the measured amplitude of the signal received by the single antenna in the second plurality of antennas from the respective antenna. The gains in equation (2) may be decibels (dB). The gain constant may be used to keep gain at the transmitter within an optimal back-off from saturation. For optimal performance of power amplifiers that are used for transmission, the input level needs to be high for high output, but not too high, so as not to distort the signal.

The controller 234 may store the phase and gain corrections for each one of the first plurality of antennas 630-1 to 630-N in the memory 236 for later use, as discussed further below. The controller 234 may also determine a phase correction and a gain correction for each one of the second plurality of antennas 680-1 to 680-N by following the above calibration procedure. In this case, the controller 234 may command the second T/R switch 650 to couple the transmitter 224 to the second antenna array device 660, and command the first T/R switch 615 to couple the receiver 242 to the first antenna array device 620.

The transmitter 224 may then transmit a signal from each one of the second plurality of antennas 680-1 to 680-N for total of N transmissions that can be time, frequency or code division transmissions, as is common in the art. The receiver 242 may receive the signals transmitted from the second plurality of antennas 680-1 to 680-N using one of the first plurality of antennas 630-1 to 630-N (i.e., a single antenna in the first plurality of antennas 630-1 to 630-N). The receiver 242 and/or controller 234 may measure the phase and amplitude of each received signal and store the results in the memory 236.

The controller 234 may command the first T/R switch 615 to couple the transmitter 224 to the first antenna array device 620, and command the second T/R switch 650 to couple the receiver 242 to the second antenna array device 660. The transmitter 224 may then transmit a signal from the one of the first plurality of antennas 630-1 to 630-N discussed above (i.e., the same antenna used to receive the signals from the second plurality of antennas 680-1 to 680-N). This signal is received by each one of the second plurality of antennas 680-1 to 680-N. The receiver 242 and/or controller 234 may measure the phase and amplitude of each received signal and store the results in the memory 236.

The controller 234 may then determine the phase and amplitude corrections for each one of the second plurality of antennas 680-1 to 680-N based on equations (1) and (2), respectively, discussed above. The controller 234 may store the phase and gain corrections for each one of the second plurality of antennas 680-1 to 680-N in the memory 236 for later use.

After the phase and gain corrections are determined for the antennas during self calibration, the controller 234 may use the phase corrections and gain corrections to precisely control the direction of a transmit beam and/or receive beam, as discussed further below. In certain aspects, the controller 234 may direct a transmit beam towards a target wireless node to enhance transmission (e.g., transmission of one or more packets) to the target wireless node. In this regard, the controller 234 may determine the direction of the transmit beam using any one of the follow exemplary techniques.

In one approach, the controller 234 may determine the direction of the transmit beam based on a known location of the wireless node 210 relative to the target wireless node. In one example, the wireless node 210 may determine its location using a location device (e.g., GPS device). The target wireless node may determine its location using a location device (e.g., GPS device), and transmit the determined location to the wireless node 210 to inform the wireless node 210 of the location of the target wireless node. This allows the wireless node 210 to determine its location relative to the target wireless node, and therefore the direction of the target wireless node. In another example, one or both of the wireless nodes may be at fixed locations that are known by each node.

In another approach, the controller 234 may determine the direction of the transmit beam using a beam training procedure. In this approach, the target wireless node may transmit beam training signals (e.g., beacons). For instance, the target wireless node may transmit the beam training signals in an omni-directional mode (e.g., in all directions). The controller 234 may instruct the first antenna array device 620 to receive the beam training signals via the first plurality of antennas using a plurality of different receive beams, where each receive beam has a different receive direction. For example, the controller 234 may instruct the first antenna array device 620 to sweep through the receive beams (e.g., one by one). For each receive beam, the first antenna array device 620 may apply the corresponding phase values with the phase corrections to the phase shifters of the receive beamformer, and apply the corresponding gain values with the gain corrections to the amplifiers of the receive beamformer.

The first T/R switch 615 may couple the received signals for the different receive directions to the receiver 242. The receiver 242 may then measure the strength (e.g., signal-to-noise ratio (SNR), receive signal strength indicator (RSSI), etc.) of each received signal (strength in each receive direction), and determine the received signal (receive direction) with the highest measured strength. The controller 234 may then select the receive direction (receive beam) corresponding to the highest measured strength.

The controller 234 may then determine the direction of the transmit beam based on the selected receive direction. For example, the direction of the transmit beam may point in approximately the same direction as the selected receive beam (receive direction with the highest measured strength).

In yet another approach, the wireless node may receive a signal from the target wireless node via the first plurality of antennas 630-1 to 630-N. The controller 234 may then measure the phase and amplitude of the signal received at each of the first plurality of antennas 630-1 to 630-N, and determine a receive direction of the signal based on the measured phases and amplitudes. The controller 234 may then determine the direction of the transmit beam based on the determined receive direction. For example, the direction of the transmit beam may point in approximately the same direction as the determined receive beam.

After determining the direction of the transmit beam, the controller 234 may determine phases and gains for the antennas 630-1 to 630-N corresponding to the determined transmit direction. For each phase, the controller 234 may apply the phase correction for the respective antenna to the phase to obtain a corrected phase. Similarly, for each gain, the controller 234 may apply the gain correction for the respective antenna to the gain to obtain a corrected gain. The controller 234 may then input the corrected phases and corrected gains to the first antenna array device 620. The first antenna array device 620 may then perform beamforming on a signal from the transmitter 224 according to the corrected phases and corrected gains to transmit the signal via the antennas 630-1 to 630-N in the determined transmit direction. More particularly, the corrected phase for each antenna may be input to the respective phase shifter 420 in the transmit beamformer, and the corrected gain for each antenna may be input to the respective amplifier in the transmit beamformer. In this example, the phase corrections and gain corrections correct for the effects of the radome and/or other factors on the transmit beam, allowing the transmit beam to be pointed with greater precision.

The full-duplex architecture also allows the wireless node 610 to perform radar applications. For example, the wireless node 610 may use the full-duplex architecture to track the position of an object (e.g., user's finger) and/or determine the shape of the object. In this example, the controller 234 may command the first T/R switch 615 to couple the transmitter 224 to the first antenna array device 620, and command the second T/R switch 650 to couple the receiver 242 to the second antenna array device 660. The controller 234 may then command the transmitter 224 to output a plurality of radar signals to the first antenna array device 620 and command the first antenna array device 620 to transmit each radar signal in a different direction via the first plurality of antennas 630-1 to 630-N.

A portion of a transmitted radar signal may reflect off the object and return to the wireless node 610, where it is detected by the wireless node. In this regard, the controller may command the second antenna array device 660 to receive the reflected signal at each one of the second plurality of antennas 680-1 to 680-N. The second T/R switch 650 may couple the received signals to the receiver 242. The receiver 242 may then measure the phase and amplitude of the signal received at each antenna, and the controller 234 may determine the direction at which the reflected signal is received based on the measured phases and amplitudes. The receiver may also measure the time of flight of the radar signal (i.e., the difference between the time that the radar signal is transmitted from the first plurality of antennas 630-1 to 630-N to the time that the corresponding reflected signal is received by the second plurality of antennas 680-1 to 680-N). The receiver may also measure the frequency offset of the radar signal. In this regard, the transmitter may send a signal to the receiver indicating the time of transmission so that the receiver can measure the time of flight. The controller 234 may then determine a location and velocity of the object relative to the wireless node 610 based on the direction at which the radar signal is transmitted from the first plurality of antennas 630-1 to 630-N, the direction at which the corresponding reflected signal is received by the second plurality of antennas 680-1 to 680-N, and the corresponding time of flight.

By transmitting radar signals in many different directions and receiving the corresponding reflected signals, the controller 234 is able to map one or more objects in two or three dimensional space. This allows the controller 234 to perform a variety of radar applications. For example, the controller 234 may track the position of a user's finger when the user makes a gesture near the wireless node 610. By tracking the position of the user's finger, the controller 234 is able to determine the gesture made by the user. The ability of the wireless node 610 to recognize gestures may be used in different applications. For example, the wireless node 610 may require a user to make a predetermined gesture with his/her finger in order to gain access to the wireless node 610 (e.g., for security purposes). In this example, the controller 634 may track the position of the user's finger to determine a gesture made by the user, compare the determined gesture to the predetermined gesture (which may be stored in the memory 236), and unlock the wireless node 610 when the determined gesture approximates the predetermined gesture.

The full-duplex modem architecture also supports self testing. For example, the wireless node 610 may transmit a test frame or packet at a high rate using one or more of the first plurality of antennas 630-1 to 630-N and receive the test frame or packet at one or more of the second plurality of antennas 680-1 to 680-N. For example, the controller 234 may command the first T/R switch 615 to couple the transmitter 224 to the first antenna array device 620 so the transmitter 224 can transmit the test frame or packet via the first plurality of antennas 630-1 to 630-N. The controller 234 may also command the second T/R switch 650 to couple the second antenna array device 660 to the receiver 242 so the receiver 242 can receive the test frame or packet via the second plurality of antennas 680-1 to 680-N. The controller 234 may then determine whether the test frame or packet is correctly received. For example, the controller 234 may determine that the test frame or packet is correctly received when the test frame or packet is successfully decoded by the receive data processor 244. In another example, the test frame or packet may have a known data pattern. In this example, the controller 234 may compare the known data pattern to the data pattern in the received test frame or packet, and determine that the test frame or packet is correctly received when the received data pattern matches the known data pattern. If the test frame or pattern is correctly received, then the controller 234 may determine that the transmitter and receiver are working as expected. If not, then the controller 234 may determine that the wireless node 610 is not working properly. In this case, the wireless node 610 may be discarded or examined to identify the cause of the failure.

In another example, the wireless node 610 may perform a self test to detect a defect in one or more power amplifiers in the wireless node (e.g., in the transmitter 224). In this example, the wireless node may transmit one or more tones using one or more of the first plurality of antennas and receive the corresponding transmitted signal using one or more of the second plurality of antennas, or vice versa. The controller 234 may then measure the amplitude of the received signal at one or more harmonic frequencies (one or more harmonics of the one or more tones) to determine whether the one or more power amplifiers are defective. For instance, the controller 234 may determine that the one or more power amplifiers are defective (e.g., suffer from high non-linear distortion) if the amplitude at the one or more harmonic frequencies is high (e.g., exceeds a threshold). When two or more tones are transmitted, the controller 234 may also measure the amplitude of one or more intermodulation products in the received signal. In this example, the controller 234 may determine that the one or more power amplifiers are defective (e.g., suffer from high intermodulation distortion) if the amplitude of the one or more intermodulation products is high (e.g., exceeds a threshold). If the controller 234 determines that the one or more power amplifiers are defective, then the wireless node 610 may be discarded or the one or more power amplifiers may be replaced. Thus, the full-duplex modem architecture enables the wireless node to perform a self test to detect power-amplifier defects in the wireless node.

Figure 7:
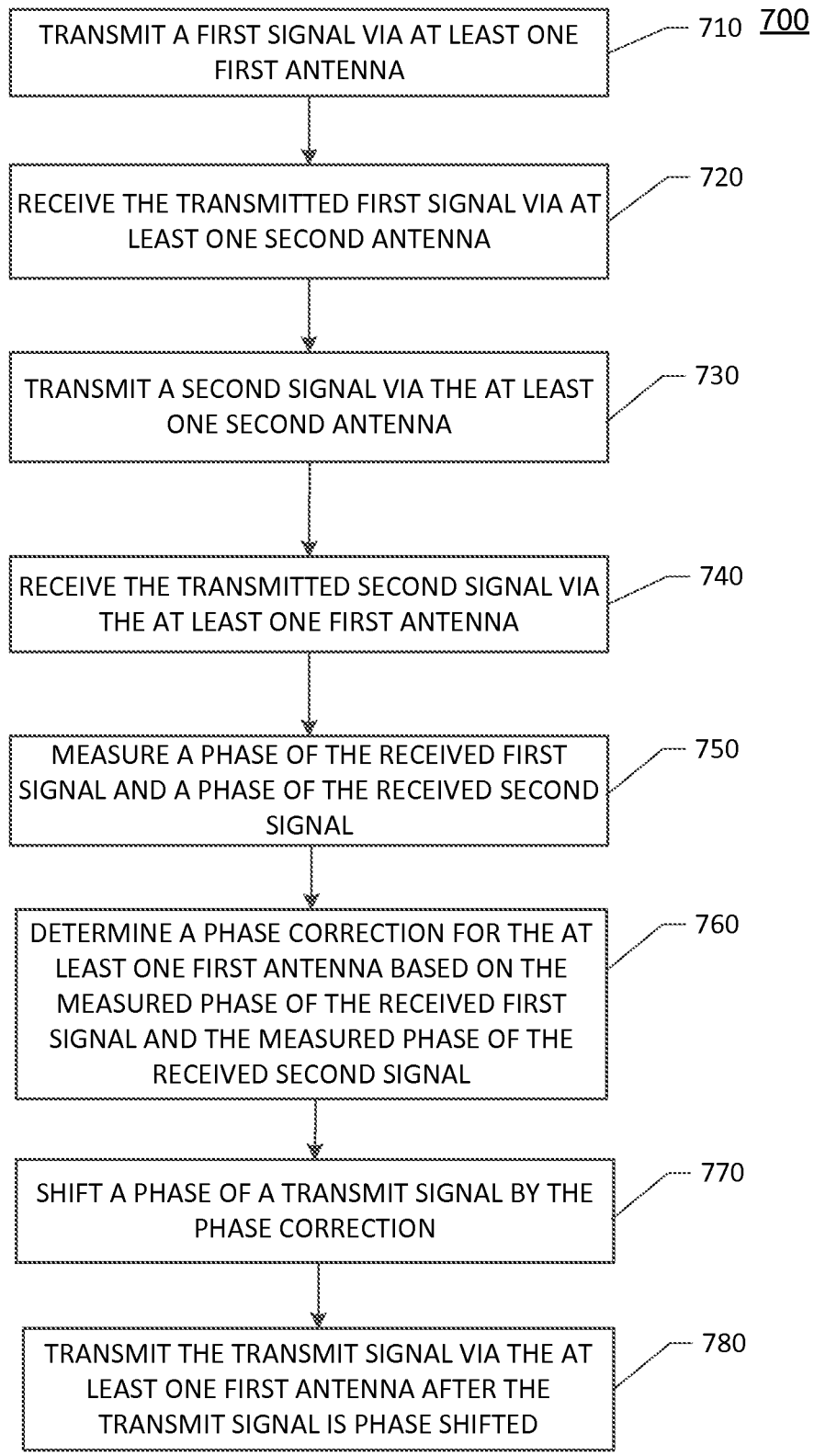
FIG. 7 is a flowchart of a method for self calibration in accordance with certain aspects of the present disclosure.

FIG. 7 is a flowchart of a method 700 for self calibration according to certain aspects. The method 700 may be performed by an apparatus (e.g., wireless node 610) for the apparatus to calibrate itself.

In step 710, a first signal is transmitted via at least one first antenna at the apparatus. For example, the first signal may be transmitted by at least one of the first plurality of antennas 630-1 to 630-N.

In step 720, the transmitted first signal is received via at least one second antenna at the apparatus. For example, the first signal may be received by at least one of the second plurality of antennas 680-1 to 680-N.

In step 730, a second signal is transmitted via the at least one second antenna. For example, the second signal may be transmitted by the at least one of the second plurality of antennas 680-1 to 680-N.

In step 740, the transmitted second signal is received via the at least one first antenna. For example, the second signal may be received by the at least one of the first plurality of antennas 630-1 to 630-N.

In step 750, a phase of the received first signal and a phase of the received second signal are measured.

In step 760, a phase correction is determined for the at least one first antenna based on the measured phase of the received first signal and the measured phase of the received second signal. For example, the phase correction may be determined based on equation (1) given above according to certain aspects.

In step 770, a phase of a transmit signal is shifted by the phase correction. For example, the phase of the transmit signal may be shifted by a phase shifter (e.g., phase shifter 420).

In step 780, the transmit signal is transmitted via the at least one first antenna after the transmit signal is phase shifted.

Figure 8:
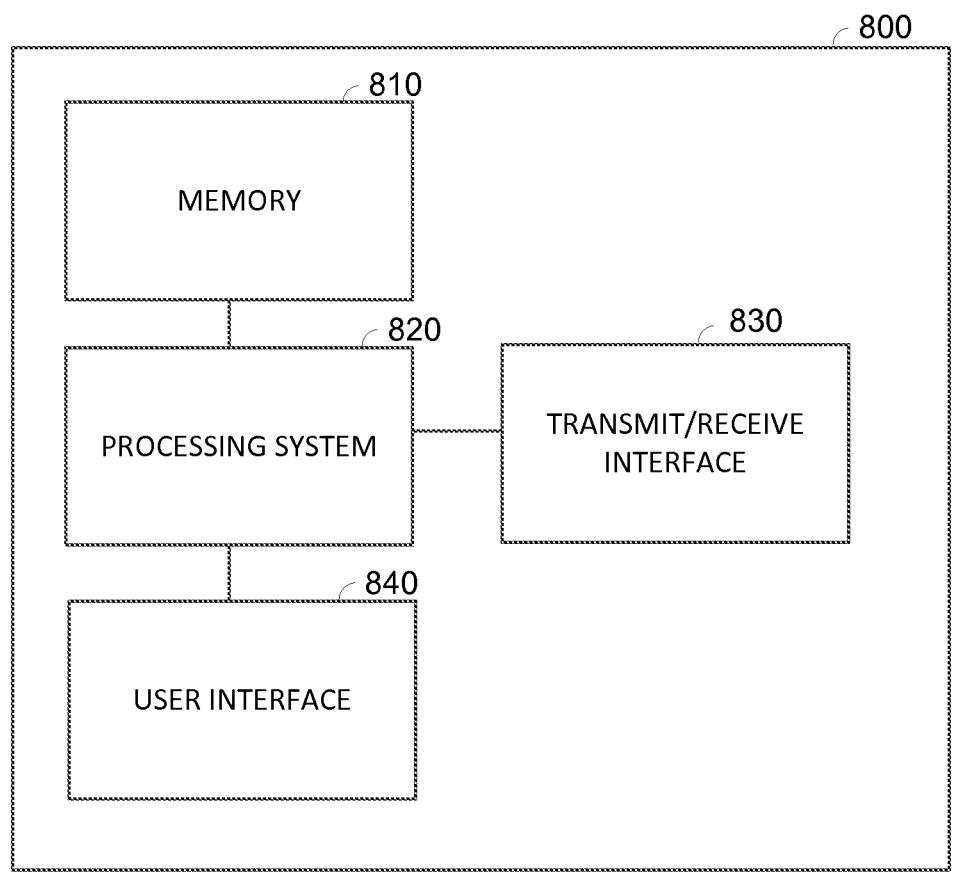
FIG. 8 illustrates an exemplary device in accordance with certain aspects of the present disclosure.

FIG. 8 illustrates an example device 800 according to certain aspects of the present disclosure. The device 800 may be configured to operate in a wireless node (e.g., wireless node 610) and to perform one or more of the operations described herein. The device 800 includes a processing system 820, and a memory 810 coupled to the processing system 820. The memory 810 may store instructions that, when executed by the processing system 820, cause the processing system 820 to perform one or more of the operations described herein. Exemplary implementations of the processing system 820 are provided below. The device 800 also comprises a transmit/receive interface 830 coupled to the processing system 820. The interface 830 (e.g., interface bus) may be configured to interface the processing system 820 to a radio frequency (RF) front end.

In certain aspects, the processing system 820 may include one or more of the following: a transmit data processor (e.g., transmit data processor 220), a frame builder (e.g., frame builder 222), a transmitter (e.g., transmitter 224), a receiver (e.g., receiver 242), a receive data processor (e.g., receive data processor 244), a transmit beamformer (e.g., transmit beamformer 415), a receive beamformer (e.g., receive beamformer 555), and/or a controller (e.g., controller) for performing one or more of the operations described herein.

In the case of an access terminal 120, the device 800 may include a user interface 840 coupled to the processing system 820. The user interface 840 may be configured to receive data from a user (e.g., via keypad, mouse, joystick, etc.) and provide the data to the processing system 820. The user interface 840 may also be configured to output data from the processing system 820 to the user (e.g., via a display, speaker, etc.). In this case, the data may undergo additional processing before being output to the user. In the case of an access point 110, the user interface 840 may be omitted.

The transmitter 224, first and second T/R switches 615 and 650, first and second antenna array devices 620 and 660, and transmit/receive interface 830 are examples of means for transmitting a first signal via at least one first antenna. The receiver 242, first and second T/R switches 615 and 650, first and second antenna array devices 620 and 660, and transmit/receive interface 830 are examples of means for receiving the first signal via at least one second antenna. The transmitter 224, first and second T/R switches 615 and 650, first and second antenna array devices 620 and 660, and transmit/receive interface 830 are examples of means for transmitting a second signal via the at least one second antenna. The receiver 242, first and second T/R switches 615 and 650, first and second antenna array devices 620 and 660, and transmit/receive interface 830 are examples of means for receiving the second signal via at least one first antenna. The controller 234 and processing system 820 are examples of means for determining a phase correction for the at least one first antenna based on the measured phase of the received first signal and the measured phase of the received second signal. The transmitter 224, first and second antenna array devices, and phase shifter 420 are examples of means for shifting a phase of a transmit signal by the phase correction. The transmitter 224, first and second T/R switches 615 and 650, first and second antenna array devices 620 and 660, and transmit/receive interface 830 are examples of means for transmitting the phase-shifted transmit signal via the at least one first antenna. The controller 234 and processing system 820 are examples of means for determining a phase based on a desired transmit direction for a transmit signal. The controller 234, processing system 820, the receiver 242, first and second T/R switches 615 and 650, first and second antenna array devices 620 and 660, and transmit/receive interface 830 are examples of means for determining a direction of a target wireless node with respect to the apparatus based on a location of the target wireless node and a location of the apparatus, the target wireless node being an intended recipient of the transmit signal. The controller 234 and processing system 820 are examples of means for determining the desired transmit direction based on the determined direction of the target wireless node. The receiver 242, first and second T/R switches 615 and 650, first and second antenna array devices 620 and 660, and transmit/receive interface 830 are examples of means for receiving a message from the target wireless node indicating the location of the target wireless node. The controller 234 and processing system 820 are examples of means for determining the location of the target wireless node from the received message. The receiver 242, first and second T/R switches 615 and 650, first and second antenna array devices 620 and 660, and transmit/receive interface 830 are examples of means for receiving a signal from a wireless node via a plurality of different receive directions. The controller 234, processing system 820, and the receiver 242 are examples of means for measuring a strength of the signal in each one of the plurality of different receive directions. The controller 234 and processing system 820 are examples of means for selecting one of the plurality of different receive directions based on the measured strengths. The controller 234 and processing system 820 are examples of means for determining the desired transmit direction based on the selected one of the plurality of different receive directions. The receiver 242, first and second T/R switches 615 and 650, first and second antenna array devices 620 and 660, and transmit/receive interface 830 are examples of means for receiving a signal from a target wireless node via the at least one first antenna. The controller 234, processing system 820, and the receiver 242 are examples of means for measuring a phase of the signal received from the target wireless node. The controller 234 and processing system 820 are examples of means for determining a phase for a transmit signal based on the measured phase of the signal received from the target wireless node. The controller 234, processing system 820, and the receiver 242 are examples of means for measuring an amplitude of the received first signal, and means for measuring an amplitude of the received second signal. The controller 234 and processing system 820 are examples of means for determining a gain correction for the at least one first antenna based on the measured amplitude of the received first signal and the measured amplitude of the received second signal. The transmitter 224, first and second antenna array devices, and amplifier 425 are examples of means for amplifying an amplitude of the transmit signal by the gain correction. The controller 234 and processing system 820 are examples of means for determining a phase and a gain based on a desired transmit direction for a transmit signal. The controller 234 and processing system 820 are examples of means for subtracting the measured phase of the received first signal from the measured phase of the received second signal to obtain a difference, and means for adding a constant to the difference. The controller 234 and processing system 820 are examples of means for subtracting the measured amplitude of the received first signal from the measured amplitude of the received second signal to obtain a difference, and means for adding a constant to the difference.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of an access terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by an access terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that an access terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus, comprising:
   an interface configured to output a first signal for transmission via at least one first antenna, to output a second signal for transmission via at least one second antenna, to receive the transmitted first signal via the at least one second antenna, and to receive the transmitted second signal via the at least one first antenna; and
   a processing system configured to measure a phase of the received first signal and a phase of the received second signal, to determine a phase correction for the at least one first antenna based on the measured phase of the received first signal and the measured phase of the received second signal, and to shift a phase of a transmit signal by the phase correction;
   wherein the interface is further configured to output the transmit signal for transmission via the at least one first antenna after the transmit signal is phase shifted, and to receive a portion of the transmit signal via the at least one second antenna after the portion of the transmit signal is reflected off of an object;
   wherein the processing system is further configured to measure a phase of the received portion of the transmit signal, and to determine a location of the object based on the measured phase of the received portion of the transmit signal; and
   wherein the object is a finger of a user, and wherein the processing system is further configured to track the location of the finger to determine a gesture made by the user.

2. The apparatus of claim 1, wherein the processing system is configured to determine the phase correction based on a difference between the measured phase of the received first signal and the measured phase of the received second signal.

3. The apparatus of claim 1, wherein the processing system is further configured to:
   determine a phase based on a desired transmit direction for the transmit signal; and
   shift the phase of the transmit signal by the determined phase and the phase correction.

4. The apparatus of claim 1, wherein the processing system is further configured to:
   measure an amplitude of the received first signal;
   measure an amplitude of the received second signal;
   determine a gain correction for the at least one first antenna based on the measured amplitude of the received first signal and the measured amplitude of the received second signal; and amplify an amplitude of the transmit signal by the gain correction;
wherein the interface is configured to output the transmit signal for transmission via the at least one first antenna after the transmit signal is phase shifted and amplified.

5. The apparatus of claim 4, wherein the processing system is configured to determine the gain correction based on a difference between the measured amplitude of the received first signal and the measured amplitude of the received second signal.

6. The apparatus of claim 4, wherein the processing system is further configured to:
determine a phase and a gain based on a desired transmit direction for the transmit signal;
shift the phase of the transmit signal by the determined phase and the phase correction; and
amplify the amplitude of the transmit signal by the determined gain and the gain correction.

7. The apparatus of claim 1, wherein the processing system is configured to determine the phase correction by subtracting the measured phase of the received first signal from the measured phase of the received second signal to obtain a difference, and adding a constant to the difference.

8. The apparatus of claim 1, wherein the processing system is configured to determine the location of the object based also on a transmit direction of the transmit signal.

9. The apparatus of claim 1, wherein the processing system is further configured to:
compare the determined gesture to a predetermined gesture; and
determine whether to unlock the apparatus based on the comparison.

10. An apparatus, comprising:
an interface configured to output a first signal for transmission via at least one first antenna, to output a second signal for transmission via at least one second antenna, to receive the transmitted first signal via the at least one second antenna, to receive the transmitted second signal via the at least one first antenna, and to receive a signal from a wireless node via a plurality of different receive directions; and
a processing system configured to measure a phase of the received first signal and a phase of the received second signal, to determine a phase correction for the at least one first antenna based on the measured phase of the received first signal and the measured phase of the received second signal, to measure a strength of the signal from the wireless node in each one of the plurality of different receive directions, to determine a transmit direction based on the measured strengths, to determine a phase based on the determined transmit direction, and to shift a phase of a transmit signal by the determined phase and the phase correction;
wherein the interface is further configured to output the transmit signal for transmission via the at least one first antenna after the transmit signal is phase shifted.

11. The apparatus of claim 10, wherein the processing system is configured to determine the phase correction based on a difference between the measured phase of the received first signal and the measured phase of the received second signal.

12. The apparatus of claim 10, wherein the processing system is further configured to:
measure an amplitude of the received first signal;
measure an amplitude of the received second signal;
determine a gain correction for the at least one first antenna based on the measured amplitude of the received first signal and the measured amplitude of the received second signal; and
amplify an amplitude of the transmit signal by the gain correction;
wherein the interface is configured to output the transmit signal for transmission via the at least one first antenna after the transmit signal is phase shifted and amplified.

13. The apparatus of claim 12, wherein the processing system is configured to determine the gain correction based on a difference between the measured amplitude of the received first signal and the measured amplitude of the received second signal.

14. The apparatus of claim 12, wherein the processing system is further configured to:
determine a phase and a gain based on the determined transmit direction for the transmit signal;
shift the phase of the transmit signal by the determined phase and the phase correction; and
amplify the amplitude of the transmit signal by the determined gain and the gain correction.

15. The apparatus of claim 10, wherein the processing system is configured to determine the phase correction by subtracting the measured phase of the received first signal from the measured phase of the received second signal to obtain a difference, and adding a constant to the difference.

16. The apparatus of claim 10, further comprising the at least one first antenna and the at least one second antenna, wherein the apparatus is configured as a wireless node.

17. A wireless node, comprising:
at least one first antenna and at least one second antenna;
a transmitter configured to transmit a first signal via the at least one first antenna, and to transmit to a second signal via at the least one second antenna;
a receiver configured to receive the transmitted first signal via the at least one second antenna, and to receive the transmitted second signal via the at least one first antenna; and
a processing system configured to measure a phase of the received first signal and a phase of the received second signal, to determine a phase correction for the at least one first antenna based on the measured phase of the received first signal and the measured phase of the received second signal, and to shift a phase of a transmit signal by the phase correction;
wherein the transmitter is configured to transmit the transmit signal via the at least one first antenna after the transmit signal is phase shifted;
wherein the receiver is configured to receive a portion of the transmit signal via the at least one second antenna after the portion of the transmit signal is reflected off of an object;
wherein the processing system is further configured to measure a phase of the received portion of the transmit signal, and to determine a location of the object based on the measured phase of the received portion of the transmit signal; and
wherein the object is a finger of a user, and wherein the processing system is further configured to track the location of the finger to determine a gesture made by the user.

18. The wireless node of claim 17, wherein the processing system is further configured to:
determine a phase based on a desired transmit direction for the transmit signal; and
shift the phase of the transmit signal by the determined phase and the phase correction.

19. The wireless node of claim 18, wherein the receiver is configured to receive a signal from a wireless node via a plurality of different receive directions, and the processing system is further configured to:
   measure a strength of the signal in each one of the plurality of different receive directions; and
   determine the desired transmit direction based on the measured strengths.

20. The wireless node of claim 17, wherein the processing system is configured to determine the location of the object based also on a transmit direction of the transmit signal.

\* \* \* \* \*